(12) United States Patent
DeCrosta, Jr.

(10) Patent No.: US 6,838,208 B2
(45) Date of Patent: Jan. 4, 2005

(54) MODIFIED THERMAL GALVANIC CELL

(76) Inventor: Edward F. DeCrosta, Jr., 28 James St., Hudson, NY (US) 12534

( * ) Notice: Subject to any disclaimer, the term of this patent is extended or adjusted under 35 U.S.C. 154(b) by 140 days.

(21) Appl. No.: 10/341,243

(22) Filed: Jan. 13, 2003

(65) Prior Publication Data
US 2004/0137284 A1 Jul. 15, 2004

(51) Int. Cl.⁷ .............. H01M 6/04; H01M 6/24; H01M 6/36
(52) U.S. Cl. .............. 429/105; 429/11; 429/347; 429/207; 429/231.8
(58) Field of Search .............. 429/11, 105, 106, 429/153, 154, 161, 319, 347, 207, 220, 231.8; 136/208

(56) References Cited

U.S. PATENT DOCUMENTS

| 3,537,972 A | * | 11/1970 | DeCrosta ............... 204/248 |
| 3,632,448 A | * | 1/1972 | Beltzer .................. 429/50 |
| 4,766,045 A | * | 8/1988 | Bellows et al. ......... 429/105 |
| 5,310,608 A | * | 5/1994 | Ishizawa et al. ........ 429/11 |
| 5,472,807 A | * | 12/1995 | Licht et al. ........... 429/188 |

* cited by examiner

Primary Examiner—Patrick Ryan
Assistant Examiner—Tracy Dove
(74) Attorney, Agent, or Firm—James Magee, Jr.

(57) ABSTRACT

This invention is directed to modified thermal galvanic cells for conversion of heat into useful electrical energy by electrochemical action using thermal and concentration differences to enhance the power produced by the cell. The cells of the invention comprise active and inert electrodes.

9 Claims, 2 Drawing Sheets

MODIFIED THERMAL GALVANIC CELL

This invention is directed to modified thermal galvanic cells for conversion of heat into useful electrical energy by electrochemical action using thermal and concentration differences to enhance the power produced by the cell. The cells of the invention comprise active and inert electrodes.

BACKGROUND

To provide an understanding of the relationship between the modified thermal concentration galvanic cells (TCG cell) of this invention and prior art cells, the basic concepts associated with galvanic cells are discussed below.

The first concept to consider is that of a metal electrode. A metal electrode is formed when a metal is immersed in a solution of one of its salts. It is referred to as a single electrode and the following reversible reaction occurs, $$M^0 \leftrightarrows M^{+n} + ne \qquad (1)$$

This is an oxidation reaction. $M^0$ refers to the metal forming an electrode, $M^{+n}$ is the ion of the metal with a positive valence of n, the number of electrons released, and e represents an electron which has a unit negative charge of electricity.

The second concept to consider is that of the reaction rate of a chemical reaction, $$aA + bB \leftrightarrows gG + hH \qquad (2)$$

in which a moles of substance A reacts with b moles of B to yield g moles of G and h moles of H. The change in free energy for the reactions has been shown to be, $$\Delta F = -RT \ln K + RT \ln Q \qquad (3)$$

where $\Delta F$ is the change in free energy; K represents the equilibrium constant involving the effective concentrations in a state of equilibrium; and Q represents the ratio of the activities of the products to the activities of the reactants, at any specified activities.

The equilibrium constant K, in Equation (3) is defined as

where a represents the effective concentrations in a state of equilibrium. Q of equation (3) represents the ratio of the activities of the product to the activities of the reactants, at any specified activities, as noted before.

A galvanic cell is formed when two dissimilar single electrodes are immersed in an electrolyte and connected to each other by means of a conductive wire, which constitutes the external electrical circuit of the galvanic cell. Electrons are released at one electrode according to Equation (1). Oxidation, or the loss of electrons, occurs at the anode. The electrons travel through the external circuit to the second electrode, called a cathode. At the cathode the positively charged metallic ions in, the electrolyte, called cations, undergo a reduction reaction in which the positively charged cation receives electrons to form a metal with no electric charge. Thus, the metallic cation becomes an electrically neutral metal atom. The electrical circuit is completed by the migration of negatively charged anions towards the anode to associate with the positively charged metallic cations released at the anode. This internal flow of electrons carried by the anions constitutes the internal circuit of the galvanic cell.

When a galvanic cell operates reversibly at constant temperature and pressure the maximum electrical work produced is related to the change in free energy, $\Delta F$, by $$\Delta F = -n F E \qquad (6)$$

in which n refers to the number of moles of electrons transferred, F is the Faraday constant (96,500 coulombs per mole) and E is the voltage developed by the cell, (one volt equals one Joule per coulomb).

Setting equations (3) and (6) equal to each other and solving for E results in E=

$$(RT/nF)\ln K - (RT/nF)\ln Q. \qquad (7)$$

In the preceding equations R is the universal gas constant (8.314 Joules/(degree-mole), T is the absolute thermodynamic temperature, (degrees Kelvin), F is the Faraday Constant (ca. 96,500 coulombs/mole), and n is the number electrons involved in the reaction. When the activities and the products and the reactants of Equation (5) are unity, In Q equals zero, and Equation (2) becomes $$E^0 = (RT/nF)(\ln K) \qquad (9)$$

In this case E is defined as $E^0$ and substituting (6) in (7)

$$E = E^0 - (RT/nF)(\ln Q) \qquad (10)$$

This equation shows the relationship between E, $E^0$, Q and T. $E^0$ is available in tables of oxidation/reduction potential.

The relationships (1) through (10) indicate that the electrical power developed by a galvanic cell can be changed, after the metals for the electrodes has been specified, by changing the metallic salt used, its concentration in the electrolyte, and the temperature of the cell.

The variety of electrodes (p.432, Outlines of Physical Chemistry, Getman and Daniels, 7th Edit. John Wiley and Sons, Inc. New York, 1947.) include:(1) Metal, metal ion, (2) Inert electrode, non-metal in solution non-metal ion, (3) Inert electrode, ions of different valence, (4) Inert electrode, gas ion, (5) Inert electrode, neutral solutes in different states of oxidation, (6) Amalgam electrode ion, (7) Electrode of an insoluble salt ion. Other variables affecting the performance of galvanic cells are associated (1) with the length of path traveled by the ions in solution, (2) the conductance of the electrolyte as a function of temperature and concentration, and (3) the interfacial surface area of the electrode contacting the electrolyte. Since the chemical reactions at the electrodes are essentially heterogeneous in nature, i.e., they occur at the interface between the electrolyte and the metal surface, the surface area of the electrodes becomes important. The number of metal ions formed is directly proportional to the area of the surface contacting the electrolyte.

Ohm's law describes the basic relationships between the factors that govern the transport of electricity through a conductor. It states that the electric current, A (amperes) equals the applied electromotive force V, (volts) divided by the resistance, R (ohms) of the conductor, $$A = E/R \qquad (11)$$

The resistance, R (ohms), is defined by the relationship $$R = \rho l/a \qquad (12)$$

where, $\rho$ is the resistivity of the medium (ohms-length), I is the length of the path through which electrons flow, and a is the cross-sectional area of the medium associated with the flow of the electrons.

This relationship, although developed for homogeneous materials of uniform cross-section, provides for some insight into the design of galvanic cells. The distance separating the electrodes corresponds to I, the length of path; a refers to the smallest cross-sectional area associated with the ionic path between the electrodes, and $\rho$ is the resistivity. The inverse of the resistivity, $k=1/\rho$, is called the conductivity. Then a combination of Equations (11) and (12) can be written, $$A=kV(a/I). \tag{13}$$

In words, the current (A) developed by a galvanic cell is directly proportional to the conductivity (k) of the electrolyte, the voltage (V) developed and the cross-sectional area (a) of the path between the anode(s) and the cathode(s), and inversely proportional to the length of the path (I) separating them. This implies that the size, shape, and distance between the electrodes as well as the conductivity of the metal composing the electrodes and the conductivity of the electrolyte affects the current developed.

The interaction between the metal electrode and the metal ions in solution occurs at the interface of a solid and a liquid; consequently, it can be considered as heterogeneous. The number of electrons released in the reaction Equation (1) is proportional to the surface area (a') of the metal at the interface. Consequently, the amperes (A) is some function of a', and Equation (13) can be written as $$A'=k'V(a'/I'). \tag{14}$$

Where the primed quantities refer to those factors associated with any of the interfaces, liquid/liquid, solid/liquid, or solid/solid boundaries internal or external to the galvanic device. Other additional factors affecting the performance of a cell are the presence or absence of Thomson, Peltier and Seebeck Effects.

Kirchoff's Rules regarding branch points and loops in an electrical circuit are applicable to the series and parallel arrangements of thermo-concentration-galvanic cells. There are four terminals in a thermal concentration galvanic cell so that the number of combinations taken two at a time is equal to six. That means that six possible voltages can be measured at the terminals of the cell. They can vary from zero to a value allowed by the design specifications of the cell.

Because of the complexity of the mechanisms involved in the evaluation of galvanic cells, a practical and heuristic approach is used to evaluate the performance of the thermo-concentration-galvanic cells disclosed here. This approach involves the application of two relationships: the Nernst Equation, and the Arrhenius Equation. One form of the Nernst Equation is $$E=-(RT/nF)\ln(a). \tag{15}$$

Here, E is the voltage developed by a modified thermocell in which an inert electrode made from an electrically conductive material that does not take place in any oxidation-reduction reaction is substituted for one of the metal electrodes. Its function is to be a source or sink for electrons flowing through the thermocell, thus accommodating the need for the ions in the electrolyte to be oxidized or reduced. The other symbols are described in preceding comments.

Equation (15) is concerned only with the oxidation reaction of the kind described by equation (1). The voltage, measured by a digital voltammeter, is quantified relative to the inert, non-reactive carbon electrode. The current flowing through the cell is measured, and, the internal resistance of the cell can be calculated by using Ohm's Law.

The Arrhenius Equation provides a means to evaluate the effect of temperature on reaction rates, $$k=A'e^{-(\Delta H/RT)} \tag{16}$$

in which k is a reaction rate, A' is called a frequency factor, e is the base of the natural logarithm, $\Delta H$ is called the heat of activation for the reaction, R is universal gas constant in appropriate form, and T is the absolute thermodynamic temperature in degrees Kelvin. In logarithmic form, (16) becomes $$\ln(k)=\ln(A')-(\Delta H/RT) \tag{17}$$

When the reaction rate k is referred to Equation (1), it can be used as a proxy for the production of electrons at an anode, and hence is the equivalent of A, the amperage developed by the half-cells, or the TCG Cell. Substituting A for k in (16) one measure of the performance of the cell will yield a straight line on a plot of $\ln(A)$ vs. $(1/T)$.

The Arrhenius Relationship and the Nernst Equation are derived from thermodynamic principles and are applicable to equilibrium reaction rates. Since, in all cases investigated to date, the reactions are spontaneous, the entropy of the system increases. Because of the formation of coordinated complexes of water molecules with the ions in the electrolyte the coordinated complexes move through the electrolyte toward their designated electrodes at a slower speed than the ion itself under the same conditions. As the temperature of the cell is increased, those coordinated complexes break down. Then ionic mobility is increased and the electric current developed by the cell increases.

When the voltage and the amperage of a cell are measured without any load or external resistance, they are called the open circuit voltage, and the open circuit current of the cell. The power of the cell is the product of the voltage and the current, or, $V \times A$. When the cell is connected to an external resistance, or load, the theoretical, maximum power developed by the cell occurs when the internal resistance of the cell is equal to the external resistance of the load.

A classification of galvanic devices that change chemical energy into electrical energy consists of: (1) non-reversible cells, (2) reversible cells, (3) concentration cells, which occur in two forms, and, (4) thermocells.

A non-reversible cell is composed of two dissimilar electrodes, (one may be inert), immersed in an electrolyte composed of a salt of one of the metals dissolved in a solvent. The voltage developed depends on the relative oxidation-reduction potentials of the electrode metals used and many other factors. An oxidation reaction leading to a loss of electrons occurs at one electrode, called the anode. A reduction reaction involving the gain of electrons occurs at the other electrode, called the cathode. The net result is that electrode materials are used up by ion migration from one electrode to the other, or changed by chemical reactions, limiting the life of the cell.

A reversible cell is sometimes called a storage cell, or battery, because it is re-charged when a voltage is imposed on the cell to reverse the chemical changes that occurred during the discharge of the cell.

A concentration cell occurs in two forms. The first kind is called a concentration cell with transference. It is composed of two identical metallic electrodes immersed in electrolytes of differing concentrations composed of a soluble salt of the metal composing the electrodes. The half-cells of the concentration cell are separated from each other by two different means. If a liquid junction is used to connect the two half cells, the cell is called a concentration cell with transference because ions can migrate from one half-cell to the other. If the half-cells do not contain a liquid bridge, and instead are separated by a salt bridge; then no ion migration is allowed between half-cells and the cell is referred to as a 'concentration cell without transference'.

Cells without a liquid junction can be constructed using different metallic or gaseous electrodes, and, different concentrations of metal (as in an amalgam), or by incorporating different surface areas of the metal in contact with the electrolyte.

Thermocells have three essential parts: (1) two identical single electrodes, (2) immersed in an electrolyte composed of a soluble salt made of the same metal as the electrodes, (3) housed in either the same container, or separate containers that are connected by a conduit filled with the electrolyte. When the electrodes are held at different temperatures, an electromotive force is developed. A modified thermocell is made by replacing one of the metal electrodes with an inert electrodes, for example a carbon electrode. Modified thermocells can be connected in series or in parallel by metal conductors. The resulting thermo-concentration-galvanic is a combination of two or more modified thermocells forming a concentration cell without transference between the half-cells.

BRIEF DESCRIPTION OF THE INVENTION

The modified galvanic cell is made by replacing one of its metal electrodes with an inert carbon electrode. Two of the modified galvanic cells, can be connected in either a series or parallel electrical connection by means of a metallic conductor. These cells are a combination of a nonreversible cell, a concentration cell without transfer, and a thermocell. When two of the modified thermocells that have one chemically active electrode and one inert electrode are electrically connected with a metallic conductor in either series or a parallel they become half-cells of the thermo-concentration-galvanic cell, (TCG Cell). This combination of half-cells is a modification of the concentration cells without transference (between the half-cells, but not within the half-cells).

DESCRIPTION OF THE INVENTION

Figure 1:
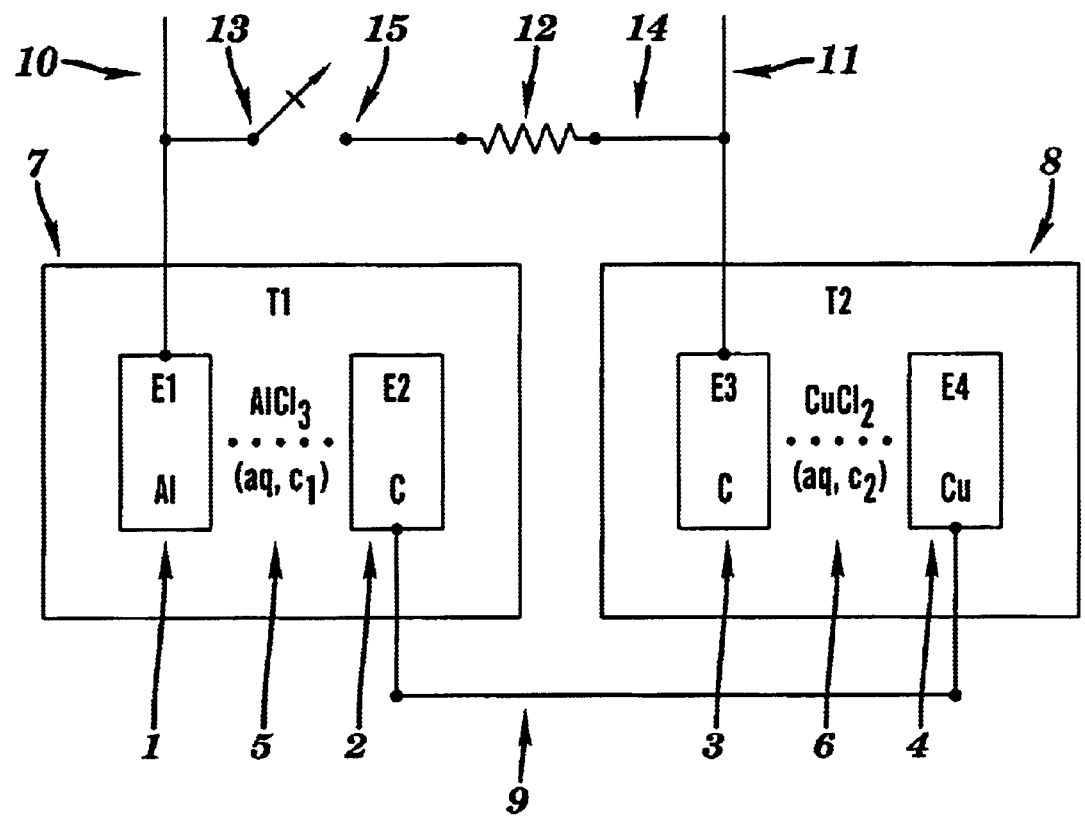
FIG. 1 is a schematic representation of a thermogalvanic cell in series connection.

The modified thermal concentration galvanic cells of the invention convert heat into useful quantities of electricity via electrochemical activity in cells using temperature and concentration differences to enhance the power developed by the cell. A galvanic cell consists of two different metallic electrodes immersed in an electrolyte made from a salt of one of the metals composing one of the electrodes. The modified galvanic cell is made by replacing one of its metal electrodes with an inert e.g., carbon, electrode. Two of the modified galvanic cells, referred to as half-cells can be connected in either a series or parallel electrical connection by means of a metallic conductor. When the cells are in a parallel connection, i.e., positive terminal to positive terminal, and negative terminal to negative terminal, the inert electrodes and the intervening conductive wire connecting them replaces the salt bridge in a concentration cell without transference. The result is a thermal concentration galvanic device (TGC Cell). It is a primary source of electricity. It is thermal because each half-cell can be subjected to increased chemical activity by increasing its temperature. It is galvanic because the metal electrode in each half-cell can be different and the metals undergo an oxidation reaction (a loss of electrons). It is a concentration cell because the concentration of the electrolytes in each half-cell can be changed independently of each other. There is no transfer of matter between the half-cells.

The possible combinations of single electrodes in a two-part 'thermo-concentration-galvanic' cell are very large. For convenience the description has been limited to the use of aluminum and copper, and the chlorides of these metals.

The number of possible combinations of single electrodes in a two-part 'thermo-concentration-galvanic' cell is very large. For purposes of brevity the following discussion has been limited to the use of aluminum and copper, and their chlorides.

The modified thermogalvanic cells of this invention convert heat into useful quantities of electricity via electrochemical activity in thermogalvanic cells using temperature and concentration differences to enhance the power developed by the cell. A galvanic cell consists of two different metallic electrodes immersed in an electrolyte made from a salt of one of the metals composing one of the electrodes. The modified galvanic cell is made by replacing one of its metal electrodes with an inert carbon electrode. Two of the modified galvanic cells, can be connected in either a series or parallel electrical connection by means of a metallic conductor. When the cells are in a parallel connection, i.e., positive terminal to positive terminal, and negative terminal to negative terminal, the inert electrodes and the intervening conductive wire connecting them replaces the salt bridge in a "concentration cell without transference." The result is a thermo-concentration-galvanic device (TGC Cell). It is a primary source of electricity. It is 'thermal' because each half-cell can be subjected to increased chemical activity by increasing its temperature. It is 'galvanic' because the metallelectrode in each half-cell can be different and the metals undergo an oxidation reaction (a loss of electrons). It is 'concentration' because the concentration of the electrolytes in each half-cell can be changed independently of each other; there is no transference of matter between the half-cells.

The possible combinations of single electrodes in a two-part 'thermo-concentration-galvanic' cell are very large. For purposes of economy we have limited ourselves to the use of aluminum and copper, and their chlorides.

The thermo-concentration-galvanic cell is a combination of three kinds of galvanic cells: a non-reversible cell, a concentration cell without transference, and, a thermocell.

A single container thermocell (no electrolyte conduit necessary) made with two metal electrodes evolved into a non-reversible cell when one of its metal electrodes was replaced by an inert carbon electrode. The thermocell was modified. This change allowed for the generation of a voltage at ambient temperatures that is enhanced at elevated temperatures. When two modified thermocells, (half-cells) are connected to each other in either a series, or a parallel electrical connection, using metallic wires to connect two electrodes a voltage can be generated at ambient temperatures if the electrodes are made from different metals. When the temperature of either one or both of the half-cells is elevated, the voltage of the resulting thermo-concentration-galvanic cell increased. Because the half-cells are connected to each other with a wire no transfer of ions between the half cells can occur. This development allows for the use of different metallic electrodes and electrolytes in each half-cell. This device becomes a "thermo concentration-galvanic cell without transference" between half-cells. The thermoconcentration-galvanic cell without transmission is referred to as a TCG-Cell.

TCG Cells, when connected in a series or a parallel arrangement, they can be used as a distributed source of electrical energy for any purpose whatsoever, as a direct current source, or, as an alternating current source of electricity with appropriate conversion devices.

The heat source can be the waste heat of the process industries, the electric power industry that uses solid, liquid, gaseous or nuclear fuels to generate heat or any facility that contains a heating system that uses a fossil or gaseous fuel. This last source would obviate the need for the infrastructure associated with the transmission of power from the generator to the consumer). Especially significant for the tropical and sub-tropical zones of the Earth is the use of solar-energy heat in-put to the earth (called insolation) which can function as a "free source" of heat for activating and/or enhancing the power out-put of the TCG Cell.

The invention will be more clearly understood when considered in view of the drawings.

FIG. 1 is a schematic of a thermo-galvanic-concentration cell with a series connection. In the particular form depicted here, electrode E1 is made from a metal (aluminum); and electrode E2 is made from an inert material (carbon). Both electrodes are immersed in an electrolyte composed of an aqueous solution, 5, of a soluble salt of the same metal composing the electrode E1 (five grams of aluminum chloride per 100 grams of water). The electrodes and the electrolyte are placed in the container 7. This constitutes a modified thermocell. When this modified thermocell is disposed in a "thermo concentration galvanic cell," it is referred to as a half-cell. Electrode E3, is made from an inert material (carbon), and electrode E4, composed of a metal (copper), along with electrolyte 6, (5 grams of copper chloride/100 grams of water) are disposed in container 8. This also constitutes a half-cell. Electrodes 2 and 4 are in electrical contact with each other by means of wire 9. Connecting the two half-cells in this manner creates a thermo-concentration-galvanic cell, TCG Cell. This is so because ion migration between the half-cells cannot occur. As a consequence, the electrode metals of each half-cell and the concentration of their respective electrolytes can be different. Electrode E1 is in electrical contact with lead wire 10. Electrode E3 is in electrical contact with lead wire 11. Wire 14 contacting resistor 12 (R=200 ohms) and switch 13 is in electrical contact with lead wires 10 and 11. Either, or both, containers, 7 & 8, can be enclosed in a heated chamber, not shown, that is equipped with a proper temperature indicator and controller.

EXAMPLE 1

Preparation of and Operating Procedure for the TCG Cell, in Series Connection

Glass jars having a nominal capacity of one hundred milliliters, and chemically resistant plastic stoppers are used as containers for the two electrodes and a mercury-in-glass thermometer. The carbon electrode has a diameter of 0.156 inches. The copper electrode is made from No. 8 solid copper wire; ten turns of wire are made into a helix by winding the wire around a 0.5 inch outer diameter pipe. The aluminum electrodes are made from tubes having an outer diameter of about 3/8 inch and an inside diameter of about 1/4 inch. Holes were drilled in the stoppers to allow for their placement. The stoppers were held in place by mechanical means. Stock solutions of each electrolyte are prepared by dissolving five grams of anhydrous copper chloride or anhydrous aluminum chloride in 100 grams of distilled water. Each half-cell container is charged with about one hundred milliliters electrolyte while allowing space for liquid expansion when the temperature is raised. The containers are placed in a hot water bath disposed on a temperature-controlled hot plate. Measurements of the voltage developed and the associated electrical current are recorded at room temperature, and an elevated temperature. Appropriate calculations are made to complete a table of data.

Referring to FIG. 1, when the switch 13 is closed the voltage drop, V(R) associated with the resistor load 12 can be measured by contacting lead wires 10 and 11. With the switch 13 open the current, A(R), flowing through the load 12 can be measured at contacts 13 and 15. The power, W(R), dissipated at the resistance 12, W(R), equals the quotient of $[V(R)]^2$ divided by A(R).

Each half-cell has its own polarity and power characteristics depending on the materials used, the concentration of the electrolyte, and the temperature of the half-cells, T1 and T2. The flow of electrons in an isolated half-cell (now a modified thermocell) would be from the metal electrode through the external circuit to the inert electrode. The electrons passing through the inert electrode are consumed by the reduction reaction that changes metal ions to the metal. This is accompanied by a diffusion of anions to the anode where they can accommodate the charge on the newly released metallic ions.

With switch 13 closed, the flow of electrons is from E1 to E3 following the external circuit 10, 14, and 11. The electrons leave E3 via a reduction reaction with copper ions leading to a deposition of copper on the carbon electrode, E3. Excess anions then diffuse to the vicinity of electrode E4. The electrons released at E4 are conducted to terminal E2 via wire 9, which, by definition, is part of the internal circuit of the TCG Cell. The electrical circuit is completed by the transport of electrons by the anions in the half-cell labeled T1. This flow of electrons causes both metallic electrodes to be anodic within the half-cells, while the carbon electrodes function as cathodes, resulting a reduction of the corresponding metal ion to the metal which tends to deposit on the carbon electrodes.

Voltages and electric currents are measured by means of a digital volt/mmeter using appropriate leads to contact the electric circuit at proper points. They will be indicated more explicitly by the legend associated with the measurement; for example, V(E1-E3) refers to a measurement of voltage between the electrodes E1 and, E3. Likewise, A(E1-E3) indicates a measure of the electrical current flowing between the electrodes E1 and E3.

The Table 1 data show the operating characteristics of the TCG Cell at room temperature, T1=20 C, and at an higher temperature, T2=82 C.

TABLE I

| TCG Cell, (Al C)—(C Cu), Series Connection | | |
|---|---|---|
| Line | T1 = T2 = 20° C. | Switch 13 Open |
| 1 | V(E1 E2) (mV) | 180 (E2 is +) |
| 2 | V(E3 E4) (mV) | 12 (E3 is +) |
| 3 V(C) | V(E1–E3) (mV) | 190 |
| 4 A(C) | A(E1–E3) (mA) | 0.42 |
| 5 W(C) | W(E1–E3) (mW) | 0.08 |

TABLE I-continued

TCG Cell, (Al C)—(C Cu), Series Connection

| Line | | T1 = T2 = 82° C. | Switch 13 closed |
|---|---|---|---|
| 6 | | V(E1–E2) (mV) | 430 (E2 is +) |
| 7 | | V(E3–E4) (mV) | 130 (E4 is +) |
| 8 | V(R) | V(E1–E3) (mV) | 320 (E3 is +) |
| 9 | A(R) | A(E1–E3) (=V/R)(mA) | 1.6 |
| 10 | W(C) | W(E1–E3) (mW) | 0.51 |

Lines 1 through 5 show selected data taken when the TCG Cell was at room temperature, circa 20 C and the switch, 13, was open. Line 1 shows the measured voltage of the modified aluminum/carbon thermocell to be 178 mV. Line 2 reports the voltage developed by the copper/carbon half-cell to be 12 mV. In both cases, the carbon electrodes exhibited a positive polarity indicating that they were receptors of electrons. The voltage (V2–V3) is not important because the resistance of the wire 9 is very small.

Line 3 measures the open circuit voltage of the TGC Cell as 191 mV. The corresponding amperage was measured as 0.42 mA between terminals 13 and 15. Thus the power of the TCG Cell, the product of the open circuit voltage and amperage, is (0.190 V)×(0.00042 A) which equals 0.08 mW.

Closing switch 13 imposes a load of 200 ohms on the system. When the entire TCG Cell is at 82° C. Lines 6 through 10 show date indicating the performance of the TCG Cell shortly after the open circuit data was accumulated. The voltage V(E1–E2) was 430 mV (compared to 178 mV, open circuit). The carbon terminal remained positive. The voltage V(E3–E4) was determined to be 130 mV compared to the 12 mV determined for the open circuit measurements taken at the same terminals when the temperature was about 20° C. The ratio of the closed circuit power dissipated by the 200 ohm load at 82° C. to the open circuit power of the TGC cell at 20° C. is 6.4. This is a significant difference and is based primarily on the temperature difference.

The copper terminal E4 had a positive polarity indicating that it functioned, at the higher temperature, as a sink or receptor of electrons. At the lower temperature, the copper terminal was negative, indicating that it functioned as a source of electrons. To measure the power dissipated at the load 12 having a resistance of R=200 ohms with the temperature of the TGC Cell at 82° C., the voltage measured by contacting lead wires 10 and 11, was found to be 320 mV compared to the voltage of 191 mV taken at 20 C. Terminal E3, the carbon electrode, was found to be positive. The amperage was determined by the relationship A=V/R. Its value at the elevated temperature was 1.6 mA, compared to 0.42 mA at the lower temperature. The power developed by the TCG Cell at the higher temperature was 0.51 Watts. The ratio of power developed by the TCG Cell at 20 C to that developed at 82° C. is equal to 6.4. This is considered a significant difference; the result is based primarily on the temperature difference.

Figure 2:
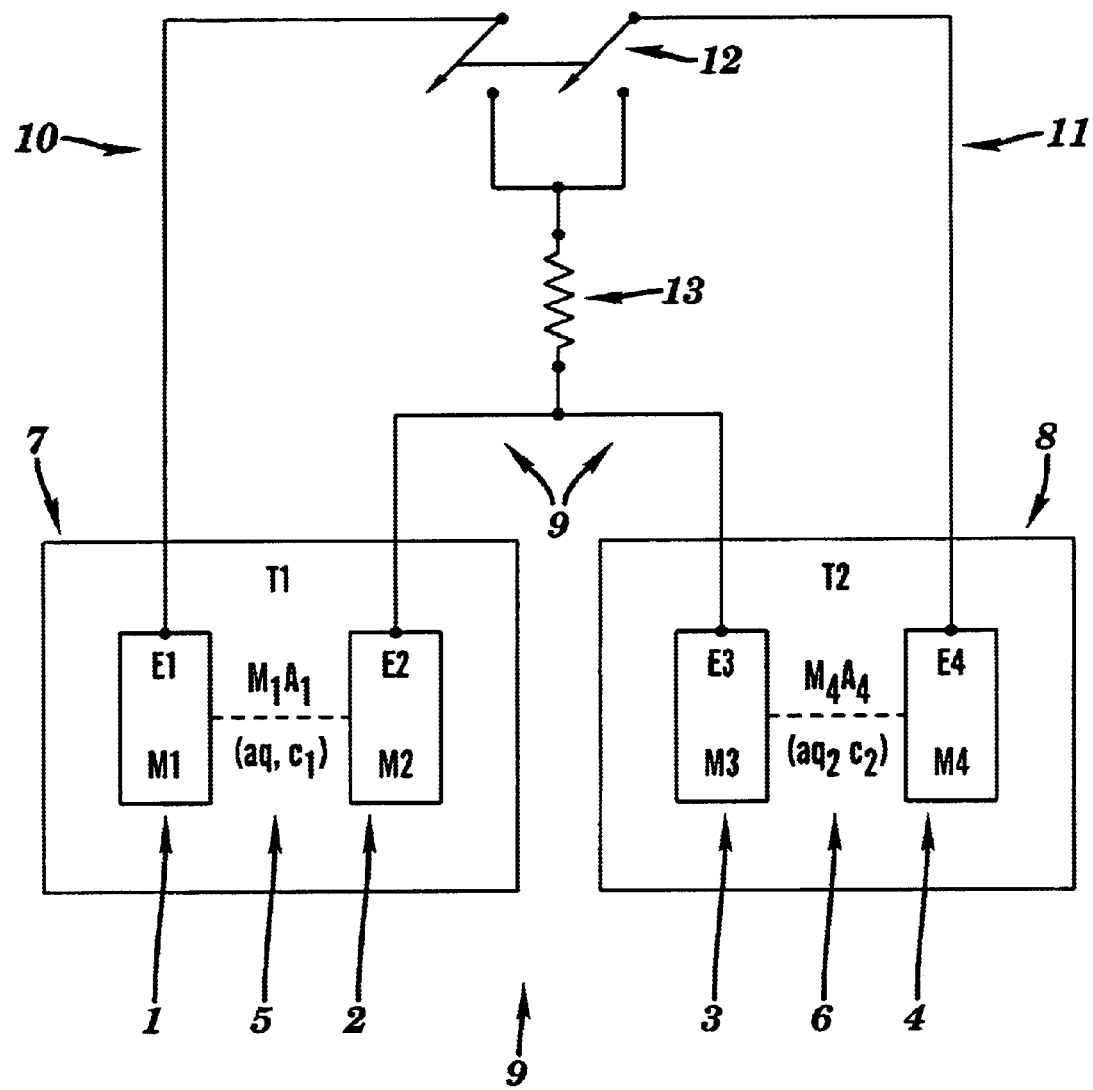
FIG. 2 is a schematic representation of a cell with parallel connecton.

FIG. 2 shows describes two half-cells, labeled T1 and T2, of a TCG Cell connected in a parallel electrical connection. In this configuration, the positive poles of each half-cell, and the negative poles of each half-cell, are in electrical contact with each other. Electrodes E1 and E2, 1 and 2, respectively, are disposed in container 7. Electrodes E3 and E4, 3 and 4, respectively, are disposed in container 8. Each half-cell may be disposed in a separate heat and temperature controlled chamber, not shown, or they may be situated in the same temperature controlled chamber, also not shown. Electrodes E1 and E4 are metallic. The metals are denoted by the symbol M1 and M4 and each undergoes an oxidation reaction when in contact with the solution of a soluble salt from which the electrode is made. The metal M1 may be the same as, but preferentially different than, metal M2. The voltage developed is a function of the metal used for the electrodes, the concentration of the electrolyte used in each half-cell, and the temperature difference between the half-cells. Electrodes E2 and E3 are inert, i.e., they do not take part in the oxidation reaction of Equation (1). However, they will become depositories for metallic ions resulting in a gradual decrease in the power of each of the half-cells. T1 and T2 also designate the temperatures applied to each half-cell. The electrolytes in T1 and T2 are designated by M1A1 and M4A4 where M1 and M4 refer to the cationic parts of a soluble salt MiAi, and A1 and A4 refer to the anionic parts of the same salt. Because there is no transference of material between the two half-cells, the metals selected for the electrodes and their associated salts may differ. That is, M1 is not necessarily the same metal as M4, and A1 need not be the same anionic part as A4 as they are in the classical concentration cell without transference. Wire 9 is in electrical contact with inert electrodes E2 and E3 that function as sinks for electrons. Consequently, reduction reactions that reduce the cations to their metallic form occur there. Wires 10 and 11 contact the terminals of electrodes E1 and E4 and terminate at a double-pole-single throw switch 12. Load 13 having a resistance of R ohms is in electrical contact with switch 12 and the wire 9. Switch 12 stops the flow of electrons through the TCG Cell. Three loops are created for electron flow when switch 12 is closed. The first is an outer loop between the two anodes E1 and E4. Its path contains the following elements: E1, line 10, the switch 12, line 11, E4, M4A4, E3, line 9, E2, M1A1, and E1. There are two inner loops. The first loop contains the elements E1, line 10, switch 12, load 13, line 9, E2, M1A1, and E1. The second inner loop contains the elements E4, line 11, switch 12, the load 13, lone 9, E3, M4A4, and E4.

Because the TCG cell as shown in FIG. 2 contains three loops (conducting paths for electrons) and two branch points, it is necessary to apply Kirchoff's Rules for networks. The first rule for branch points states that the algebraic sum of the currents towards any branch point of a network is zero. The second rule for loops states that the algebraic sum of the emf's in any loop of a network equals the algebraic sum of the Ri products in the same loop. R is the resistance of the load in ohms, and i is the current flow in amperes.

The cells of this invention can be provided in various embodiments. In a major embodiment the cells of the invention comprise a thermal concentration galvanic cell comprising two or more half cells each containing one or more metallic electrodes and one or more inert electrodes that are immersed in an electrolyte comprising an aqueous solution of a soluble salt of the same metal as that from which the metal electrodes is made. The cells can be configured in series connection or in parallel connection. The metallic electrodes of each half-cell can be made from different metals or the same metal. The soluble salts comprising the electrolyte in each half-cell can be the same or different from each other, disregarding any water of crystallization. The half cells or half cell containers can be positioned in separate temperature controlled chambers or in the same temperature controlled chamber or vessel.

What is claimed is:

1. A thermal concentration galvanic cell comprising:
   a first half cell including a first metallic electrode, a first inert electrode and a first electrolyte comprising an aqueous solution of a soluble salt of the metal of the first metallic electrode; wherein the first metallic electrode is immersed in the first electrolyte; and,
   a second half cell including a second metallic electrode, a second inert electrode and a second electrolyte comprising an aqueous solution of a soluble salt of the metal of the second metallic electrode; wherein the second metallic electrode is immersed in the second electrolyte.

2. The cell according to claim 1 in which the first and second inert electrodes are a carbon material.

3. The cell of claim 1 in which the first half cell comprises at least two first electrodes containing the same metal or the second half cell comprises at least two second electrodes containing the same metal.

4. The cell of claim 1 in which the first and second metallic electrodes are comprised of different metals.

5. The cell according to claim 1 in which the soluble salt in the first half cell is different from the soluble salt in the second half cell.

6. The cell according to claim 1 in which the first and second half cells are contained in separate chambers maintained at the same temperature.

7. The cell according to claim 1 in which the first and second half cells are contained in separate chambers maintained at different temperatures.

8. The cell according to claim 1 in which the first and second half cells are connected in series.

9. The cell according to claim 1 in which the first and second half cells are connected in parallel.

* * * * *